(12) United States Patent
Huang et al.

(10) Patent No.: US 12,431,583 B2
(45) Date of Patent: Sep. 30, 2025

(54) BATTERY PACK AND VEHICLE (71) Applicant: CONTEMPORARY AMPEREX TECHNOLOGY (HONG KONG) LIMITED, Hong Kong (CN)

(72) Inventors: Haihua Huang, Ningde (CN); Wumei Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 429 days.

(21) Appl. No.: 17/511,277

(22) Filed: Oct. 26, 2021

(65) Prior Publication Data
US 2022/0052415 A1 Feb. 17, 2022

Related U.S. Application Data (63) Continuation of application No. PCT/CN2020/117309, filed on Sep. 24, 2020.

(30) Foreign Application Priority Data

Oct. 15, 2019 (CN) .......................... 201910975581.3

(51) Int. Cl.
*H01M 50/383* (2021.01)
*H01M 50/143* (2021.01)
(Continued)

(52) U.S. Cl.
CPC ....... *H01M 50/383* (2021.01); *H01M 50/143* (2021.01); *H01M 50/209* (2021.01);
(Continued)

(58) Field of Classification Search
CPC ........... H01M 2220/20; H01M 50/383; H01M 50/249; H01M 50/143; H01M 50/209; H01M 50/35; B60L 50/64; B60L 53/53
See application file for complete search history.

(56) References Cited

U.S. PATENT DOCUMENTS

2013/0071706 A1* 3/2013 Lee ..................... H01M 10/486
429/62
2017/0033343 A1 2/2017 Miyawaki
(Continued)

FOREIGN PATENT DOCUMENTS

CN 102110843 A 6/2011
CN 102110843 B 6/2011
(Continued)

OTHER PUBLICATIONS

Zheng, CN210182427 U EPO machine translation, 2020 (Year: 2020).*
(Continued)

*Primary Examiner* — Jonathan G Leong
*Assistant Examiner* — Kan Luo
(74) *Attorney, Agent, or Firm* — Ladas & Parry LLP (57) ABSTRACT A battery pack and a vehicle are provided. The battery pack includes: a box cover, a battery row, a protective member, and a constraining component. A first path for guiding airflow to flow in a first direction is provided between the protective member and an upper surface of the battery row. The constraining component is located between the battery row and an inner wall of a cavity in the first direction, at least a part of a top of the constraining component is lower than the upper surface of the battery row, the constraining component constrains the battery row, and the part of the top of the constraining component lower than the upper surface of the battery row, the battery row, and the box cover form a second path communicating with fluid in the first path. The battery pack allows smoother discharge of produced gas and better safety performance.

10 Claims, 5 Drawing Sheets (51) Int. Cl.
  *H01M 50/209* (2021.01)
  *H01M 50/249* (2021.01)
  *H01M 50/35* (2021.01)

(52) U.S. Cl.
  CPC ......... *H01M 50/249* (2021.01); *H01M 50/35* (2021.01); *H01M 2220/20* (2013.01)

(56) References Cited

U.S. PATENT DOCUMENTS

| | | | |
|---|---|---|---|
| 2018/0047951 | A1 | 2/2018 | Lee et al. |
| 2019/0273232 | A1 | 9/2019 | Fu et al. |
| 2021/0104798 | A1 | 4/2021 | Jiang |
| 2021/0249731 | A1 | 8/2021 | You et al. |
| 2022/0123427 | A1* | 4/2022 | Ren et al. ............ H01M 50/342 |

FOREIGN PATENT DOCUMENTS

| | | | | |
|---|---|---|---|---|
| CN | 109742281 | A | | 5/2019 |
| CN | 209104229 | U | | 7/2019 |
| CN | 209183604 | U | | 7/2019 |
| CN | 110190212 | A | | 8/2019 |
| CN | 209401710 | U | | 9/2019 |
| CN | 210182427 | U | * | 3/2020 ............ H01M 2/10 |
| EP | 3125334 | A2 | | 2/2017 |
| EP | 3261169 | A1 | | 12/2017 |
| EP | 3852188 | A1 | | 7/2021 |
| JP | 2008243672 | A | | 10/2008 |
| JP | 2011108653 | A | | 6/2011 |
| JP | 2012015121 | A | | 1/2012 |
| JP | 2013171746 | A | | 9/2013 |
| JP | 2017033721 | A | | 2/2017 |
| JP | 2017098014 | A | | 6/2017 |
| KR | 20110073221 | A | | 6/2011 |
| KR | 20130031532 | A | | 3/2013 |
| WO | 2018087680 | A1 | | 5/2018 |

OTHER PUBLICATIONS

Jiang, CN209183604 U EPO machine translation, 2019 (Year: 2019).*
First Office Action of JP application No. 2022-523012, mailed May 29, 2023.
Extended European Search Report of EP application No. 20876475.3, Dated Sep. 26, 2022.
ISR for International Application PCT/CN2020/117309 mailed Dec. 7, 2020.
Written Opinion for International Application PCT/CN2020/117309 mailed Dec. 7, 2020.
Chinese First OA for counterpart CN201910975581.3 mailed May 28, 2021.
Notice of Allowance, KR application No. 10-2022-7012577, dated Apr. 3, 2024.

* cited by examiner

BATTERY PACK AND VEHICLE

CROSS-REFERENCE TO RELATED APPLICATIONS

This application is a continuation of International Patent Application No. PCT/CN2020/117309 filed on Sep. 24, 2020, which claims priority to Chinese Patent Application No. 201910975581.3 filed on Oct. 15, 2019. The aforementioned patent applications are incorporated herein by reference in their entirety.

TECHNICAL FIELD

This application relates to the field of battery technologies, and in particular, to a battery pack and a vehicle.

BACKGROUND

As new energy vehicles are flourishing, demands for traction battery products are increasing, and safety performance of the battery products is drawing increasingly attention.

Thermal runaway is an important threat to the safety performance of the battery products. In a traditional battery pack, an upper part of the battery pack is generally covered with fireproof cotton to temporarily slow down heat spread in the event of thermal runaway. Although such method can provide some protection, a problem of poor gas circulation is present. As a result, high-temperature gas, flames, and other fluids produced in thermal runaway damage the battery pack and even cause safety accidents because they cannot be discharged promptly.

SUMMARY

A technical problem to be resolved by this application is to improve safety performance of battery packs.

To resolve the foregoing technical problem, this application provides a battery pack, including:
- an accommodating box, including a box body and a box cover, where a cavity is provided inside the box body, and the box cover is closed on a top of the box body;
- a battery row, including a plurality of batteries arranged side by side in the cavity along a first direction, where a battery includes a top cover and an explosion-proof valve disposed on the top cover;
- a protective member, where the protective member covers all explosion-proof valves of the battery row, a first path for guiding fluid to flow in the first direction is provided between the protective member and an upper surface of the top cover, and the first direction is perpendicular to a height direction of the battery; and
- a constraining component, disposed in the cavity, located between the battery row and an inner wall of the cavity in the first direction, and configured to constrain the battery row;
- where in the height direction, at least a part of a top of the constraining component is lower than the upper surface of the top cover, and the part of the top of the constraining component lower than the upper surface of the top cover, the battery row, and the box cover form a second path communicating with the first path.

In some embodiments, the battery pack includes at least two battery rows and at least two protective members, where the at least two battery rows are arranged side by side along a second direction, the at least two protective members are in one-to-one correspondence with the at least two battery rows, the constraining component constrains the at least two battery rows, and the second direction is perpendicular to the first direction and the height direction.

In some embodiments, the battery pack includes two constraining components, where the two constraining components are respectively located at two opposite sides of the battery row in the first direction.

In some embodiments, an explosion-proof exhaust structure is provided on a side plate of the box cover that is opposite the second path, and the explosion-proof exhaust structure communicates with the second path and is configured to discharge the fluid in the second path out of the battery pack.

In some embodiments, the explosion-proof exhaust structure includes an explosion-proof valve or a weak part, where the weak part is a part of the side plate, and the weak part has lower strength than other parts of the side plate.

In some embodiments, the battery pack further includes a partitioning structure, where the partitioning structure is disposed in the cavity and partitions the cavity into at least two accommodating zones, the batteries in the battery pack are grouped and arranged in different accommodating zones, the partitioning structure includes a first partitioner, the first partitioner extends in the first direction, and the constraining component is connected to the first partitioner.

In some embodiments, the partitioning structure further includes a second partitioner, where the second partitioner intersects with the first partitioner, and the second partitioner and the first partitioner jointly partition the cavity into the at least two accommodating zones.

In some embodiments, a space between the upper surface of the top cover and a top plate of the box cover and outside the first path is filled with thermal insulation glue.

In some embodiments, the protective member has an inverted U-shaped cross section.

Another aspect of this application further provides a vehicle, where the vehicle includes a traction source and the battery pack of this application, the traction source is configured to provide traction for the vehicle, and the battery pack is configured to supply power to the traction source.

In this application, the at least the part of the top of the constraining component is set to be lower than the upper surface of the battery row, and the part of the top of the constraining component lower than the upper surface of the battery row, the battery row, and the box cover form the second path communicating with fluid in the first path, so that produced gas guided out by the first path can be more smoothly guided to two sides of the box body of the battery pack for discharge, providing more smooth discharge of produced gas and improving safety performance of the battery pack.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show merely some embodiments of this application, and a person of ordinary skill in the art may still derive other drawings from these accompanying drawings without creative efforts.

In which:

100. battery pack;
1. accommodating box; 11. box body; 111. cavity; 111a. inner wall; 112. side part; 113. convex part; 114. bottom part; 12. box cover; 121. top plate; 122. side plate; 123. flange part; 1a. accommodating zone; 13. explosion-proof exhaust structure;
2. thermal insulation glue;
3. partitioning structure; 31. first partitioner; 32. second partitioner;
4. battery module; 41. battery row; 41a. first battery row; 41b. second battery row; 411. battery; 411a. top cover; 411b. explosion-proof valve; 42. protective member; 421. main body plate; 422. bent plate;
5. constraining component;
P1. first path; P2. second path; H. height direction; W. first direction; and L. second direction.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. The following description of at least one example embodiment is merely illustrative and definitely is not construed as any limitation on this application or on use of this application. All other embodiments obtained by a person of ordinary skill in the art based on the embodiments of this application without creative efforts shall fall within the protection scope of this application.

The technologies, methods, and devices known to those of ordinary skill in the related art may not be discussed in detail, but where appropriate, the technologies, methods, and devices should be regarded as being authorized as a part of the specification.

In the description of this application, it should be understood that the use of words "first", "second" and the like to define parts is merely intended to distinguish between the respective parts, and unless otherwise specified, the words have no special meaning and therefore are not construed as any limitation on the protection scope of this application.

In addition, technical features in different embodiments of this application described below can be combined with each other as long as they do not conflict with each other.

FIG. 1 to FIG. 6 show a battery pack according to an embodiment of this application. In the illustrated embodiment, the battery pack 100 is used as a power apparatus of a vehicle, disposed in a vehicle body, and configured to provide electric power for the vehicle. In some embodiments, the vehicle may include: a traction source that provides traction for the vehicle, and a battery pack according to some embodiments, where the battery pack is configured to supply power to the traction source, so as to provide electric power for the vehicle. The vehicle may include an electric vehicle, a hybrid electric vehicle, or the like. The electric vehicle may use an electric engine powered by electric energy output from the battery pack as the traction source, and the electric vehicle may use the battery pack according to some embodiments to power the electric engine, for example, a main traction source and/or a backup traction source. The hybrid electric vehicle may use two or more types of traction sources, for example, internal combustion engines and electric motors, to provide traction.

To clearly describe the orientations below, directions of the battery pack 100 are defined by using a coordinate system in FIG. 1. The coordinate axis H represents a height direction of the battery pack 100 and is also a height direction of an accommodating box 1 and a battery 411 in the accommodating box 1; the coordinate axis W is perpendicular to the coordinate axis H and referred to as a first direction, and represents a width direction of the battery pack; and the coordinate axis L is perpendicular to the coordinate axis H and the coordinate axis W and referred to as a second direction, and represents a length direction of the battery pack.

Based on the foregoing orientation definitions, the terms "over", "under", "top", "bottom", and the like used in the following descriptions to indicate the orientation or position relationship are all relative to the height direction H. A box cover 12 and a box body 11 of the battery pack are disposed oppositely in the height direction H, the box cover 12 is over the box body 11, and the box body 11 is under the box cover 12.

However, it should be understood that, the foregoing orientation definitions are merely intended to simplify the descriptions of this application for a purpose of easy description. Unless otherwise stated, these orientation words do not indicate or imply that an apparatus or an element must have a particular orientation or must be constructed and operated in a particular orientation. Therefore, this shall not be construed as any limitation on the protection scope of this application.

As shown in FIG. 1 to FIG. 8, the battery pack 100 of this embodiment includes an accommodating box 1 and a battery module 4.

Figure 2:
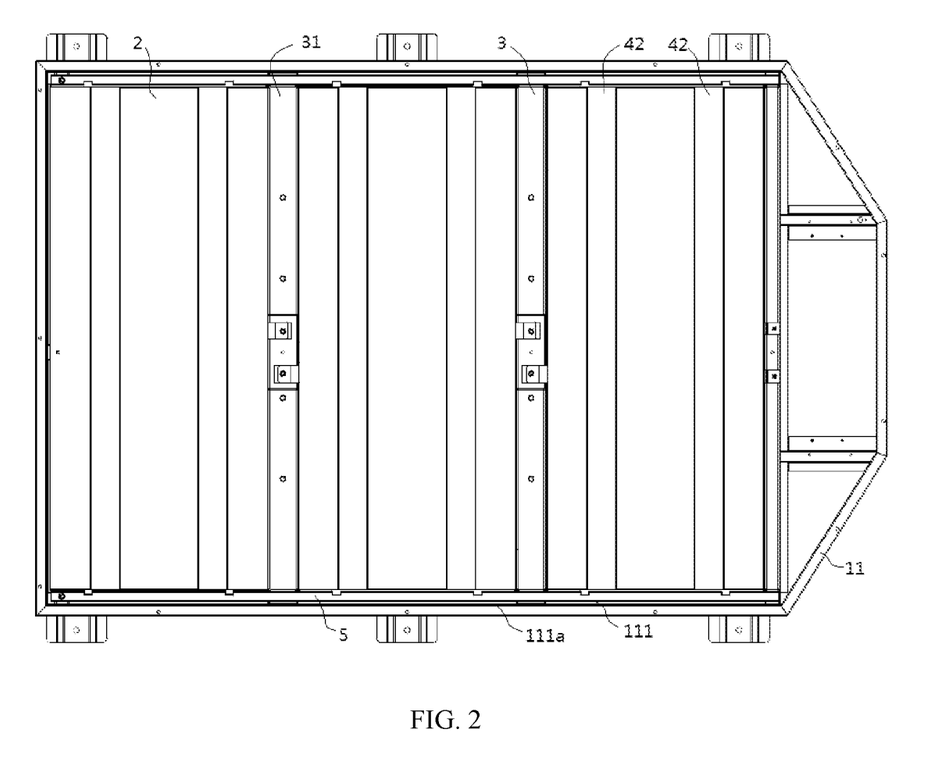
FIG. 2 is a vertical view of the battery pack shown in FIG. 1 with a box cover omitted.
Figure 3:
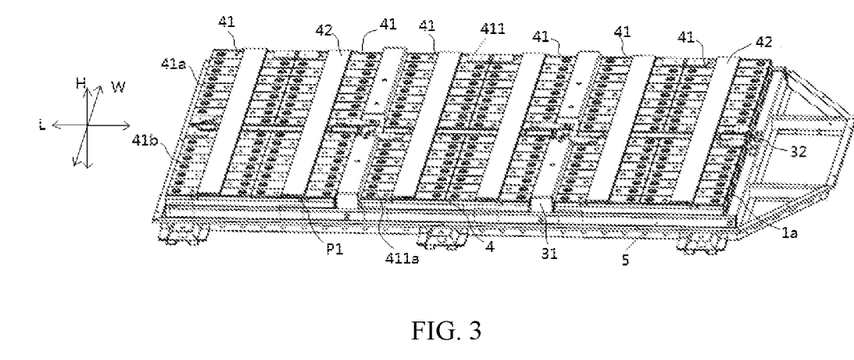
FIG. 3 is a schematic three-dimensional structural diagram of FIG. 2 with thermal insulation glue omitted.
Figure 4:
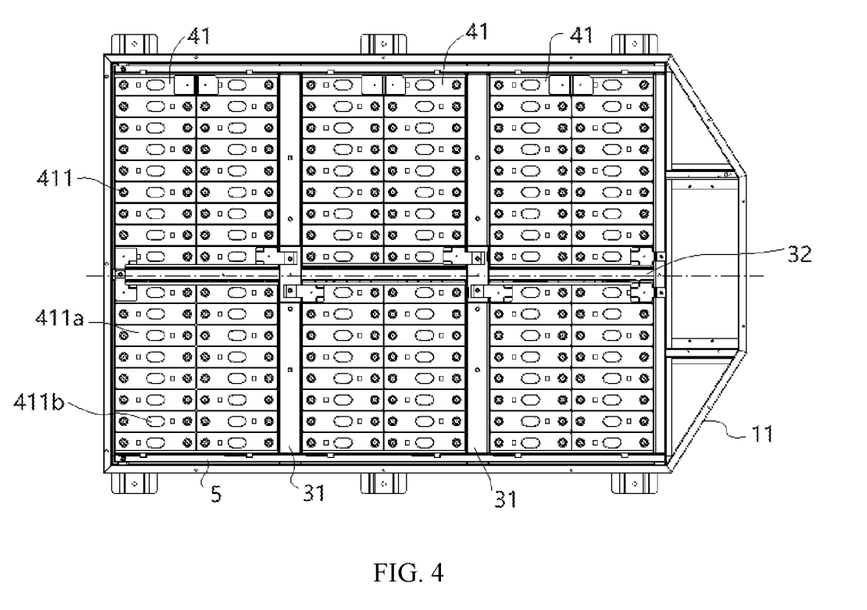
FIG. 4 is a vertical view of FIG. 3 with a protective member omitted.

The accommodating box 1 is configured to accommodate the battery module 4 to provide protection for the battery module 4 inside the accommodating box 1. As shown in FIG. 1 to FIG. 3, in this embodiment, the accommodating box 1 includes a box body 11 and a box cover 12. A cavity 111 is provided inside the box body 11 for accommodating the battery module 4 and the like, where a top of the cavity 111 is open to facilitate insertion or removal of the battery module 4, and the box cover 12 is closed on a top of the box body 11 to seal the cavity 111. The box cover 12 is adapted to the box body 11 in a sealed manner. For example, a sealing ring or other sealing elements may be provided between the box cover 12 and the box body 11.

It can be learned from FIG. 3 that the box body 11 includes a bottom part 114, a side part 112, and a convex part 113. The side part 112 and the bottom part 114 enclose the cavity 111, the side part 112 is connected to the periphery of the bottom part 114 and extends upward, and the convex part 113 is connected to one end of the side part 112 and extends outward in a second direction L. Specifically, the side part 112 and the bottom part 114 enclose a hollow cuboid, and the inner cuboid cavity 111 is configured to accommodate the battery module 4. The convex part 113 is trapezoid, and electronic components may be arranged on the convex part 113 to control working modes such as charging and discharging of the battery module 4.

Figure 1:
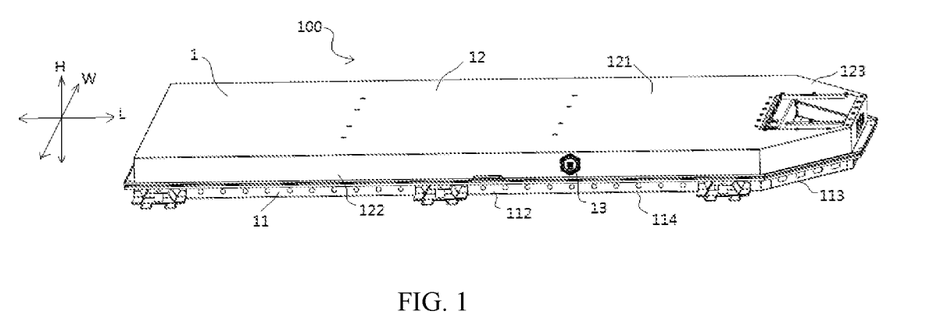
FIG. 1 is a schematic three-dimensional structural diagram of a battery pack according to an embodiment of this application.
Figure 6:
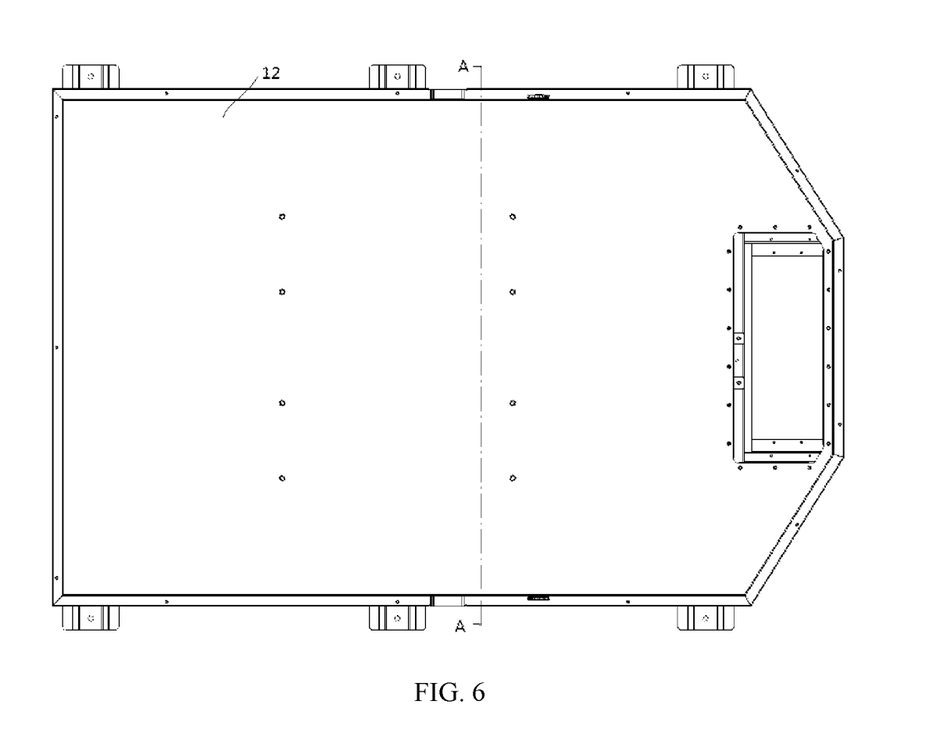
FIG. 6 is a vertical view of FIG. 1.

It can be learned from FIG. 1 and FIG. 6 that the box cover 12 is adapted to the box body 11 in overall shape, and includes a rectangular part and a trapezoidal part. The rectangular part includes a top plate 121 and a side plate 122 connected to the periphery of the top plate 121 and extending downward. The trapezoidal part is connected to one end of the side plate 122 and extends outward in the second direction L to form a flange part 123.

When the box cover 12 is closed on the box body 11, the side plate 122 of the box cover 12 mates with the side part 112 of the box body 11, and the flange part 123 of the box cover 12 mates with to the convex part 113 of the box body 11, so as to seal the cavity 111.

When the accommodating box 1 is disposed on a vehicle body, the box cover 12 faces upwards, and a side on which the convex part 113 and the flange part 123 are located is disposed close to the front of the vehicle. In other words, when the battery pack 100 is installed on the vehicle, the height direction H is a height direction of the vehicle body, and the second direction L is a length direction of the vehicle body, which is also a direction in which the vehicle travels.

The battery module 4 is disposed in the cavity 111 and is a core component of the battery pack 100 for providing electric energy for the vehicle. As shown in FIG. 3 to FIG. 8, in this embodiment, the battery module 4 includes a battery row 41 and a protective member 42.

The battery row 41 includes a plurality of batteries 411, where the battery 411 includes a top cover 411a and an explosion-proof valve 411b disposed on the top cover 411a. When the battery 411 is experiencing thermal runaway, the explosion-proof valve 411b may be forced to open by gas, heat, flames, and high-temperature and high-pressure fluid (collectively referred to as produced gas) produced inside the battery 411, and the produced gas is discharged out of the battery 411, so that pressure inside the battery 411 is released from the top cover 411a.

All the batteries 411 in the battery row 41 are arranged side by side along the same direction. In FIG. 3, all the batteries 411 in the battery row 41 are arranged vertically, the height direction H is the vertical direction and is consistent with the height direction of the box body 11, and the top covers 411a all face upwards, in other words, the top covers 411a all face toward the box cover 12 and face away from the box body 11. In addition, all the batteries 411 in the battery row 41 are arranged side by side along the first direction W to form a row.

The protective member 42 covers all explosion-proof valves 411b of the battery row 41, and a first path P1 for guiding airflow to flow in the first direction W is provided between the protective member 42 and an upper surface of the top cover 411a. Based on this, the protective member 42 can protect the battery row 41 and control a diffusion range of the produced gas, so that the produced gas discharged from the explosion-proof valve 411b on the top cover 411a can be guided by the protective member 42 along the first path P1 to flow to two sides of the battery pack 100 in the first direction W, instead of being directly sprayed upwards. This not only can guide the produced gas to discharge from the two sides of the battery pack 100 in the first direction W, reduce accumulation of the produced gas inside the battery pack 100, and improve use safety of the battery pack 100, but also can prevent the produced gas from directly impacting a passenger above the battery pack 100, thereby improving the safety performance of the vehicle.

Figure 5:
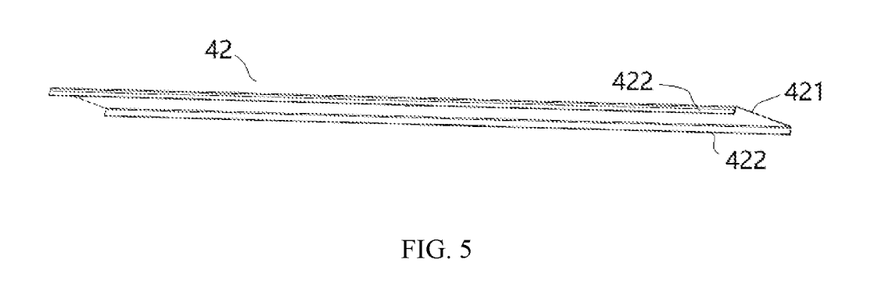
FIG. 5 is a schematic three-dimensional structural diagram of the protective member in FIG. 3.

Specifically, as shown in FIG. 5, the protective member 42 includes a main body plate 421 and two bent plates 422. The main body plate 421 extends in the first direction W. The two bent plates 422 are connected to opposite ends of the main body plate 421 in the second direction L respectively, and are both bent downward relative to the main body plate 421 (that is, toward the direction close to the battery row 41). Based on this, the two bent plates 422 support the main body plate 421 over the battery row 41, and the main body plate 421, the two bent plates 422, and the upper surface of the top cover 411a form the first path P1 extending in the first direction W. A top of the first path P1 and two ends of the first path P1 in the second direction L are all closed, and only two ends of the first path P1 in the first direction W are open, so that under the action of the protective member 42, the produced gas rushing out from the explosion-proof valve 411b of the battery 411 cannot flow upwards any more, but flows out in the first direction W. When the batteries are installed on the vehicle body, the first direction W is the width direction of the vehicle body, instead of the direction in which the front of the vehicle or a passenger is located. Therefore, guiding the produced gas to be discharged in the width direction of the vehicle body can safely discharge the produced gas and reduce threat of the produced gas to safety of the passenger.

The main body plate 421 and the bent plates 422 may be in various plate structures such as flat plates, curved plates, or specially shaped plates, and the protective member 42 may have a cross section (that is, a section perpendicular to the first direction W) of various shapes such as an inverted U shape or M shape. For example, in FIG. 3, the protective member 42 has an inverted U-shaped cross section. Compared with other shapes, the protective member 42 has a simpler structure, so as to facilitate processing.

To limit the protective member 42 conveniently, the protective member 42 may be connected to the box cover 12, for example, may be welded to the top plate 121 through the main body plate 421, to install and fix the protective member 42 and help the protective member 42 more reliably cover the all explosion-proof valves 411b of the battery row 41. Compared with the protective member 42 having an M-shaped cross section and other shapes, for the protective member 42 having an inverted U-shaped cross section, the main body plate 421 of the protective member 42 and the top plate 121 can be in closer contact with each other based on a larger area, thereby facilitating stronger welding between the protective member 42 and the top plate 121.

As shown in FIG. 3, in this embodiment, the battery module 4 is provided with six battery rows 41, and the six battery rows 41 are arranged side by side along the second direction L. In addition, the battery module 4 includes six protective members 42, and the protective members 42 are all arranged in a one-to-one correspondence with the battery rows 41, so that each protective member 42 can be used to guide the produced gas released by explosion-proof valves 411b of a corresponding battery row 41 to be discharged in the first direction W.

In a variant embodiment, the number of battery rows 41 in the battery module 4 may alternatively be one or two. In other words, the battery module 4 may include one or at least two battery rows 41. When the battery module 4 includes at least two battery rows 41, the battery rows 41 are all arranged side by side along the second direction L, and in this case, the protective members 42 in the battery module 4 have the same quantity as the battery rows 41 and are arranged above the battery rows 41 in a one-to-one correspondence.

As set forth, the battery pack 100 of this embodiment includes a plurality of battery rows 41, and the number of batteries 411 in each battery row 41 is more than one. Therefore, the battery pack 100 has a plurality of batteries 411, and the plurality of batteries 411 are arranged in rows and columns to form a multi-row and multi-column battery array.

For more orderly placement of the plurality of batteries 411 in the battery pack 100, as shown in FIG. 2 and FIG. 3, the battery pack 100 may further include a partitioning structure 3, where the partitioning structure 3 is disposed in the cavity 111 and partitions the cavity 111 into at least two accommodating zones 1*a*, and the batteries 411 in the battery pack 100 are grouped and arranged in different accommodating zones 1*a*. In this way, different groups of batteries 411 are respectively accommodated in different accommodating zones 1*a*, which makes the placement more orderly and convenient, and in addition, the different groups of batteries 411 can be more reliably limited by the partitioning structure 3.

It can be learned from FIG. 3 that the partitioning structure 3 of this embodiment includes a first partitioner 31, where the first partitioner 31 extends in the first direction W, and partitions the cavity 111 into different accommodating zones 1*a* arranged in the second direction L; and the partitioning structure 3 further includes a second partitioner 32, where the second partitioner 32 extends in the second direction L, and intersects with the first partitioner 31. In this way, the second partitioner 32 further partitions the accommodating zones 1*a* partitioned by the first partitioner 31, so that there are more accommodating zones 1*a* in the cavity 111. These accommodating zones 1*a* not only include accommodating zones 1*a* arranged in the second direction L, but also include accommodating zones 1*a* arranged in the first direction W.

When the batteries 411 are grouped and placed in the cavity 111, different battery rows 41 may be grouped and accommodated in different accommodating zones 1*a* arranged in the second direction L, so as to realize partition placement of different groups of battery rows 41, and batteries 411 in the same battery row 41 are grouped and accommodated in the first direction W in different accommodating zones 1*a* arranged in the first direction W, so as to realize the partition placement within the same battery row 41 in the first direction W.

Specifically, in the illustrated embodiment, it can be learned from FIG. 3 that the partitioning structure 3 includes two first partitioners 31 and one second partitioner 32, and the two first partitioners 31 are apart from each other and arranged side by side along the second direction L, and the second partitioner 32 is perpendicular to both of the two first partitioners 31. In this way, under the action of the first partitioners 31 and the second partitioner 32, the partitioning structure 3 partitions the cavity 111 into 2 rows and 3 columns, that is, a total of six accommodating zones 1*a*. The six battery rows 41 arranged side by side along the second direction L are partitioned by the two first partitioners 31, where two battery rows 41 are located on the same side of the same first partitioner 31, and one battery row 41 is further partitioned by the second partitioner 32 in the first direction W, so that each battery row 41 is partitioned by the second partitioner 32 into a first battery row 41*a* and a second battery row 41*b* that are arranged in the first direction W, and the first battery row 41*a* and the second battery row 41*b* in the same battery row 41 are also in different accommodating zones 1*a*.

More specifically, as shown in FIG. 3, in this embodiment, the second partitioner 32 is located in the middle of the battery row 41 in the first direction W, so that the number of batteries 411 in the first battery row 41*a* is equal to the number of batteries 411 in the second battery row 41*b*.

It should be understood that the number of first partitioners 31, the number of second partitioners 32, and a position of the first partitioner 31 are not limited to those shown in FIG. 3. For example, the number of second partitioners 32 may alternatively be at least two. For another example, the number of first partitioners 31 may alternatively vary with the number of battery rows 41, generally one less than the number of battery rows 41. When the number of first partitioners 31 is at least two, the first partitioners 31 are spaced apart from each other and arranged side by side along the second direction L. For another example, the second partitioner 32 may not be located in the middle of the battery row 41 in the first direction W, but may be located close to one side in the first direction W. In this case, the number of batteries 411 in the first battery row 41*a* is not equal to the number of batteries 411 in the second battery row 41*b* any more.

The first partitioner 31 and the second partitioner 32 may be constructed as a beam structure. In FIG. 3, the first partitioner 31 may be referred to as a transverse beam, and the second partitioner 32 may be referred to as a longitudinal beam. In addition, the first partitioner 31 and the second partitioner 32 are both fixedly connected to the box body 11. Specifically, the first partitioner 31 and the second partitioner 32 are both fixedly connected to the bottom part 114 of the box body 11.

To more reliably constrain the batteries 411 in the battery pack 100, as shown in FIG. 2 to FIG. 6, in this embodiment, the battery pack 100 further includes a constraining component 5, where the constraining component 5 is disposed in the cavity 111, located between the battery row 41 and an inner wall 111*a* of the cavity 111 in the first direction W, and configured to constrain the battery row 41. By disposing the constraining component 5, the displacement of the battery row 41 in the first direction W can be constrained, especially a swelling force experienced by the battery row 41 can be resisted, so that swelling and deformation of the battery row 41 can be reduced.

The constraining component 5 may be connected to the first partitioner 31 to, for example, fix the constraining component 5.

The constraining component 5 may extend from one end to the other end of the cavity 111*a* in the second direction L, for example, may be configured as a beam structure or a plate structure extending in the second direction L, so that the constraining component 5 can constrain all battery rows 41 in the battery module 4 that are arranged in the second direction L, to limit all the battery rows 41. In this way, there is no need to separately provide the constraining component 5 for each battery row 41, thereby effectively reducing the number of constraining components 5, simplifying the overall structure of the battery pack 100, and facilitating installation of the battery module 4 in the accommodating box 1.

The constraining component 5 may be provided only on one side of the battery row 41 in the first direction W. However, in this embodiment, the constraining component 5 is provided on two opposite sides of the battery row 41 in the first direction W, to be specific, the battery pack 100 includes two constraining components 5 respectively arranged on two opposite sides of the battery row 41 in the first direction W, so that the two constraining components 5 can be used to clamp the battery row 41 in the middle to achieve a more reliable limitation effect.

Figure 7:
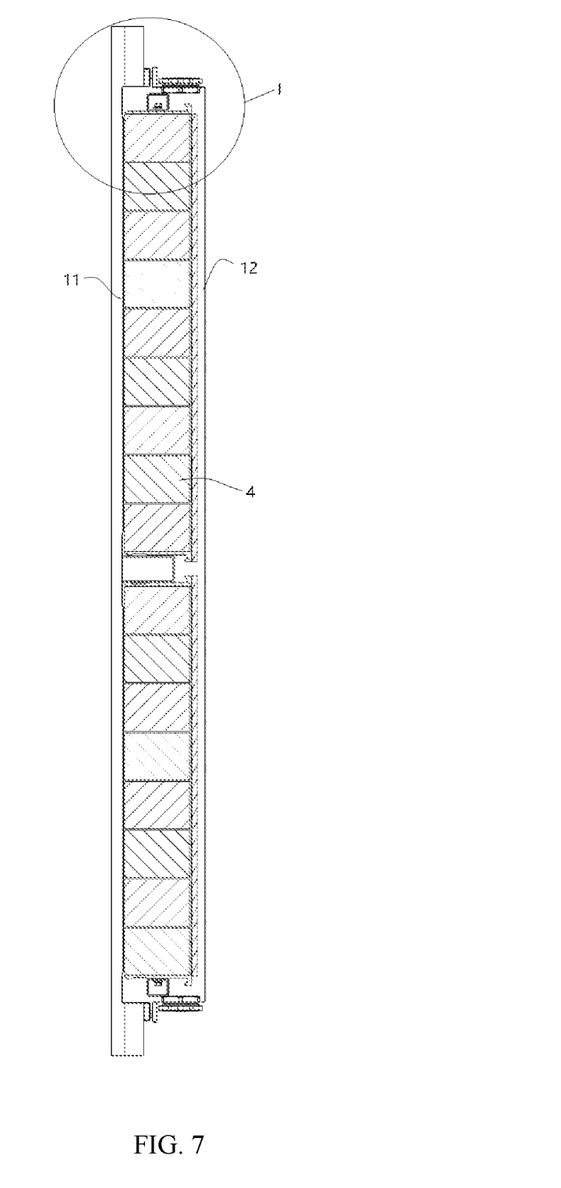
FIG. 7 is a cross-sectional view of FIG. 6 in A-A direction.
Figure 8:
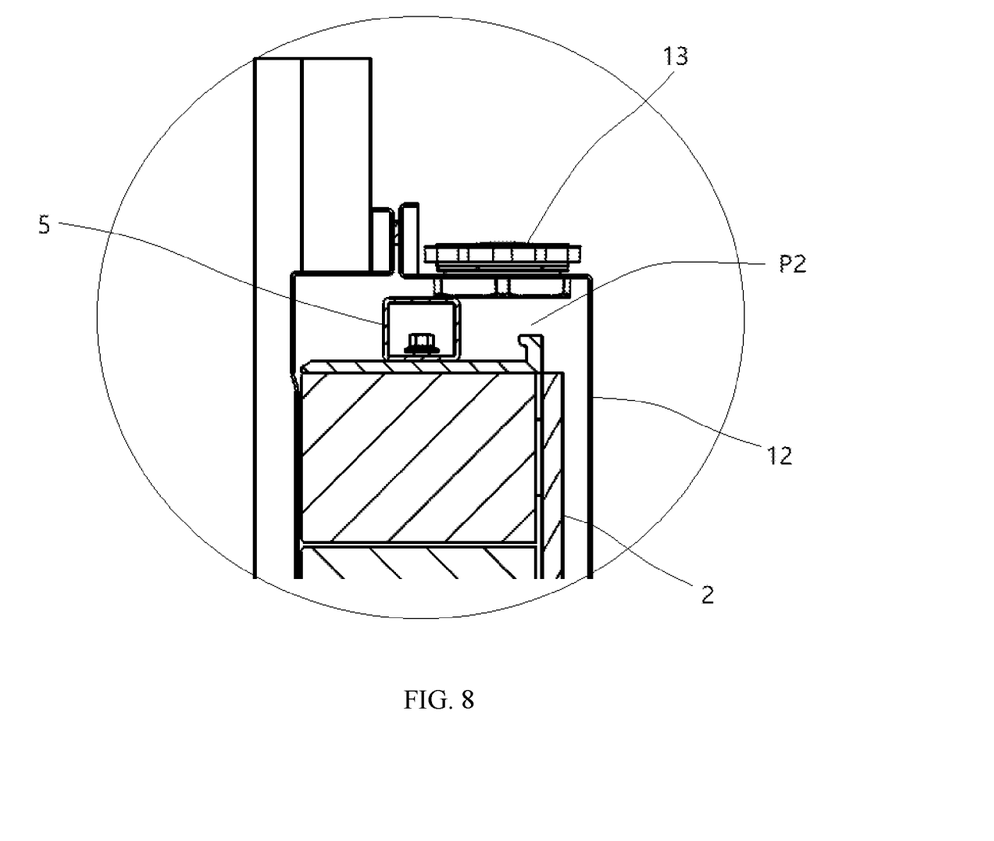
FIG. 8 is a partial enlarged schematic diagram of part I in FIG. 7.

To further facilitate the discharge of the produced gas, as shown in FIG. 7 and FIG. 8, in this embodiment, in the height direction H, the two constraining components 5 are both disposed with their tops lower than the upper surface of the top cover 411a, so that the tops of the constraining components 5, the battery row 41, and the box cover 12 form a second path P2 communicating with the first path P1. As a result, the produced gas flowing out of the first path P1 can be more smoothly discharged to two sides of the battery pack 100 in the first direction W under the guidance of the second path P2, and the high-temperature and high-pressure fluid produced inside the battery 411 is released promptly when the battery 411 experiences thermal runaway, preventing heat spread and reducing safety risks. In addition, compared with other methods of forming the second path P2, for example, providing a recessed groove in the first direction W on the surface of the constraining component 5, forming the second path P2 is simpler in both structure and process by making the tops of the constraining components 5 lower than the upper surface of the top cover 411a.

In some variant embodiments, for the two constraining components 5, instead of disposing the entire top being lower than the upper surface of the top cover 411a, only a part of the top is lower than the upper surface of the top cover 411a. In this case, a part of a top of the constraining component 5 lower than the upper surface of the top cover 411a, the battery row 41, and the box cover 12 can still form the second path P2. However, a size of the second path P2 in the second direction L is smaller than that of the illustrated embodiment.

In some other variant embodiments, at least a part of a top of only one of the two constraining components 5 may alternatively be lower than the upper surface of the top cover 411a. In this case, the second path P2 is formed only on one side of the battery row 41 in the first direction W.

Under the directional guidance of the first path P1 and the second path P2, the produced gas rushing out from the inside of the battery 411 can more smoothly flow in the first direction W to two sides of the accommodating box 1 in the first direction W, and then is discharged on the two sides of the accommodating box 1 in the first direction W.

To further facilitate the discharge of the produced gas flowing out of the second path P2 out of the accommodating box 1, as shown in FIG. 1 and FIG. 6, in this embodiment, an explosion-proof exhaust structure 13 is provided on the side plate 122 of the box cover 12 that is opposite the second path P2, and the explosion-proof exhaust structure 13 communicates with the second path P2 and is configured to discharge the fluid in the second path P2 out of the battery pack 100. The explosion-proof exhaust structure 13 may include an explosion-proof valve 411b; or the explosion-proof exhaust structure 13 may include a weak part, where the weak part is a part of the side plate 122, and the weak part has lower strength than other parts of the side plate 122. The weak part may be, for example, a groove or an indentation in the side plate 122.

The explosion-proof exhaust structure 13 is disposed on the side plates 122 at two ends of the box cover 12 in the first direction W, so that the produced gas guided by the second path P2 can be easily discharged through the explosion-proof exhaust structure 13, with smoother exhaust achieved. In addition, the explosion-proof exhaust structure 13 can control the discharge of the produced gas to some extent, for example, can control the produced gas to be discharged when a preset pressure is reached, helping to further improve the use safety of the battery pack 100.

It can be learned from FIG. 6 that in the constraining component 5 of this embodiment, the top of the constraining component 5 is lower than the upper surface of the top cover 411a, and at least a part of the constraining component 5 is also made to be lower than the bottom of the explosion-proof exhaust structure 13, so that the constraining component 5 can avoid the explosion-proof exhaust structure 13, which is beneficial to keeping the explosion-proof exhaust structure 13 unobstructed and is more convenient for the produced gas to be discharged through the explosion-proof exhaust structure 13.

In addition, as shown in FIG. 2, in this embodiment, a space between the upper surface of the top cover 411a and the top plate 121, except for the part corresponding to the protective member 42, is filled with the thermal insulation glue 2. Based on this, in the entire height direction H, the space between the top plate 121 and the upper surface of the battery row 41, except for a zone corresponding to the protective member 42, is filled by and sealed with the thermal insulation glue 2, helping to further improve the safety performance of the battery pack 100. If the space between the top plate 121 and the upper surface of the battery row 41 outside the protective member 42 is not sealed, the produced gas guided by the first path P1 to two sides of the battery row 41 in the first direction W may flow back to the space between the top plate 121 and the upper surface of the top cover 411a outside the protective member 42, which poses threat to the use safety of the battery pack 100. In this embodiment, the space between the top plate 121 and the upper surface of the top cover 411a outside the protective member 42 is sealed by using the thermal insulation glue 2. This can effectively prevent the produced gas guided by the first path P1 from flowing back to the top of the battery row 41, and help the produced gas guided by the first path P1 to more fully flow to the second path P2, thereby helping improve the safety performance of the battery pack 100. In addition, the battery rows 41 arranged in the second direction L can also be separated due to thermal insulation performance of the thermal insulation glue 2, to prevent a battery row 41 that has already experienced thermal runaway from causing other battery rows 41 to also experience thermal runaway. From such point of view, the provision of the thermal insulation glue 2 also helps to improve the safety performance of the battery pack 100.

In conclusion, in this application, the first path P1 and the second path P2 can more effectively and more reliably guide the produced gas to be discharged to the explosion-proof exhaust structure 13 in the desired first direction W, and promptly release the high-temperature and high-pressure fluid produced inside the battery 411 when the battery 411 experiences thermal runaway, preventing the produced gas from spreading in the accommodating box 1, reducing the risk of thermal runaway, improving use safety of the battery pack 100, and reducing safety risks of passengers in a vehicle to which the battery pack 100 is applied.

The foregoing descriptions are merely example embodiments of this application, but are not intended to limit this application. Any modification, equivalent replacement, or improvement made without departing from the spirit and principle of this application shall fall within the protection scope of this application.

What is claimed is:

1. A battery pack, comprising:
an accommodating box, comprising a box body and a box cover, wherein a cavity is provided inside the box body, and the box cover is closed on a top of the box body;
a plurality of battery rows, each battery row comprising a plurality of batteries arranged side by side in the cavity along a first direction, the first direction being a thickness direction of the batteries, and the battery rows being arranged along a second direction perpendicular to the first direction, wherein each battery comprises a top cover and an explosion-proof valve disposed on the top cover;
a protective member, covering all explosion-proof valves of the battery row, wherein a first path for guiding a fluid to flow in the first direction is provided between the protective member and an upper surface of the top cover, and the first direction is perpendicular to a height direction of the battery; and
a constraining component, configured to constrain the battery rows;
wherein the constraining component is disposed in the cavity, located between an end of the battery rows and an inner wall of the cavity, and extends in the second direction across the battery rows;
wherein, in the height direction, a top of the constraining component is lower than the upper surface of the top cover, and a bottom of the constraining component is a distance away from a bottom surface of the box body; and
wherein the top of the constraining component, the battery rows, and the box cover form a second path, and the second path is connected with the first path, allowing the fluid flowing out of the first path be discharged to one side of the battery pack through the second path.

2. The battery pack according to claim 1, wherein the battery pack comprises at least two battery rows and at least two protective members, the at least two battery rows are arranged side by side along the second direction, the at least two protective members are in one-to-one correspondence with the at least two battery rows, and the constraining component constrains the at least two battery rows.

3. The battery pack according to claim 1, wherein the battery pack comprises two constraining components, and the two constraining components are respectively located at two opposite ends of the battery rows.

4. The battery pack according to claim 1, wherein an explosion-proof exhaust structure is provided on a side plate of the box cover that is opposite to the second path, and the explosion-proof exhaust structure communicates with the second path and is configured to discharge the fluid in the second path out of the battery pack.

5. The battery pack according to claim 4, wherein the explosion-proof exhaust structure comprises an explosion-proof valve or a weak part, the weak part is a part of the side plate, and the weak part has lower strength than other parts of the side plate.

6. The battery pack according to claim 1, wherein the battery pack further comprises a partitioning structure, the partitioning structure is disposed in the cavity and partitions the cavity into at least two accommodating zones, the batteries in the battery pack are grouped and arranged in different accommodating zones, the partitioning structure comprises a first partitioner, the first partitioner extends in the first direction, and the constraining component is connected to the first partitioner.

7. The battery pack according to claim 6, wherein the partitioning structure further comprises a second partitioner, the second partitioner intersects with the first partitioner, and the second partitioner and the first partitioner jointly partition the cavity into the at least two accommodating zones.

8. The battery pack according to claim 1, wherein the protective member has an inverted U-shaped cross section.

9. A vehicle, comprising:
a traction source, wherein the traction source provides traction for the vehicle; and
the battery pack according to claim 1, wherein the battery pack is configured to supply power to the traction source.

10. The battery pack according to claim 1, wherein a space between the upper surface of the top cover and a top plate of the box cover and outside the first path is filled with thermal insulation glue.

* * * * *